United States Patent [19]

Akiyoshi et al.

[11] Patent Number: 5,548,729
[45] Date of Patent: Aug. 20, 1996

[54] SYSTEM FOR AUTOMATICALLY GENERATING AND SAVING CONTROL INFORMATION IN A SERVER IF REQUESTED BY A CLIENT AT SYSTEM INITIALIZATION FOR OPERATING IN A NETWORK

[75] Inventors: Takashi Akiyoshi, Osaka; Tetsuo Matsuse, Ikoma-gun, both of Japan

[73] Assignee: Matsushita Electric Industrial Co., Ltd., Osaka, Japan

[21] Appl. No.: 900,906

[22] Filed: Jun. 18, 1992

[30] Foreign Application Priority Data

Jun. 21, 1991 [JP] Japan ................................ 3-150024

[51] Int. Cl.⁶ .......................... G06F 13/00; G06F 13/14
[52] U.S. Cl. ........................ 395/200.16; 395/200.1; 395/200.02; 395/200.12; 395/200.06; 364/940.62
[58] Field of Search ........................ 395/200, 600, 395/200.16, 200.1, 200.2, 200.6, 200.12, 400, 325, 700; 370/85, 94.3, 95.3, 94; 364/200; 380/25; 340/825.05

[56] References Cited

U.S. PATENT DOCUMENTS

| | | | |
|---|---|---|---|
| 4,142,234 | 2/1979 | Bean et al. | 364/200 |
| 4,484,273 | 11/1984 | Stiffler et al. | 364/200 |
| 4,510,493 | 4/1985 | Bux et al. | 340/825.05 |
| 4,689,786 | 8/1987 | Sidhu et al. | 370/94 |
| 4,853,843 | 8/1989 | Ecklund | 364/200 |
| 4,941,084 | 7/1990 | Terada et al. | 364/200 |
| 5,014,192 | 5/1991 | Mansfield et al. | 364/200 |
| 5,067,154 | 11/1991 | Hosobuchi et al. | 380/25 |
| 5,113,499 | 5/1992 | Ankney et al. | 395/325 |
| 5,123,101 | 6/1992 | Sindhu | 395/400 |
| 5,142,680 | 8/1992 | Ottman et al. | 395/700 |
| 5,150,464 | 9/1992 | Sidhu et al. | 395/200 |
| 5,155,808 | 10/1992 | Shimizu | 395/200 |
| 5,157,390 | 10/1992 | Yoshi et al. | 340/825.52 |
| 5,255,384 | 10/1993 | Sachs et al. | 395/425 |

FOREIGN PATENT DOCUMENTS 0182417  11/1985  European Pat. Off. .

OTHER PUBLICATIONS

Bill Croft and John Gilmore, Bootstrap Protocol (BOOTP), Sep. 1985.
Quick Configuration of Desktop SPARC on the Network, Sun Os 4.1.1 Rev. B Release Manual (Revision A of Jan. 18, 1991).
W. M. Loucks et al., Implementation Of A Dynamic Address Assignment Protocol In A Local Area Network.

*Primary Examiner*—Thomas C. Lee
*Assistant Examiner*—Le Hien Luu
*Attorney, Agent, or Firm*—Price, Gess & Ubell

[57] ABSTRACT

There is disclosed an apparatus for setting control information of a computer system comprising a control information request device for requesting the apparatus for setting control information of another computer system connected over a network to transmit the control information, when a storage device is judged not to store the information by the control information storage check device, a receive device for receiving the control information transmitted from the apparatus for setting control information of the other computer system and allowing the storage device to store it. There is also disclosed an apparatus for setting control information of a computer system comprising a receive device for receiving the request for transmitting the control information transmitted from the apparatus for setting control information of the other computer system, and a transmission device for transmitting the control information stored in a storage device to the apparatus for setting control information of the other computer system. There is further disclosed an apparatus for setting control information of a computer system comprising a control information registration request device for requesting the apparatus for setting control information of the other computer system connected over the network to register inputted control information. There is further disclosed an apparatus for setting control information of a computer system comprising a receive device for receiving the request to register the control information transmitted from the apparatus of the other computer system, and a storage device for storing the requested control information.

19 Claims, 6 Drawing Sheets

SYSTEM FOR AUTOMATICALLY GENERATING AND SAVING CONTROL INFORMATION IN A SERVER IF REQUESTED BY A CLIENT AT SYSTEM INITIALIZATION FOR OPERATING IN A NETWORK

BACKGROUND OF THE INVENTION

1. Field of the Invention

This invention relates to an apparatus and method for setting control information such as a network address applied to a computer system in order to communicate over a network.

2. Description of the Related Art

Figure 1:
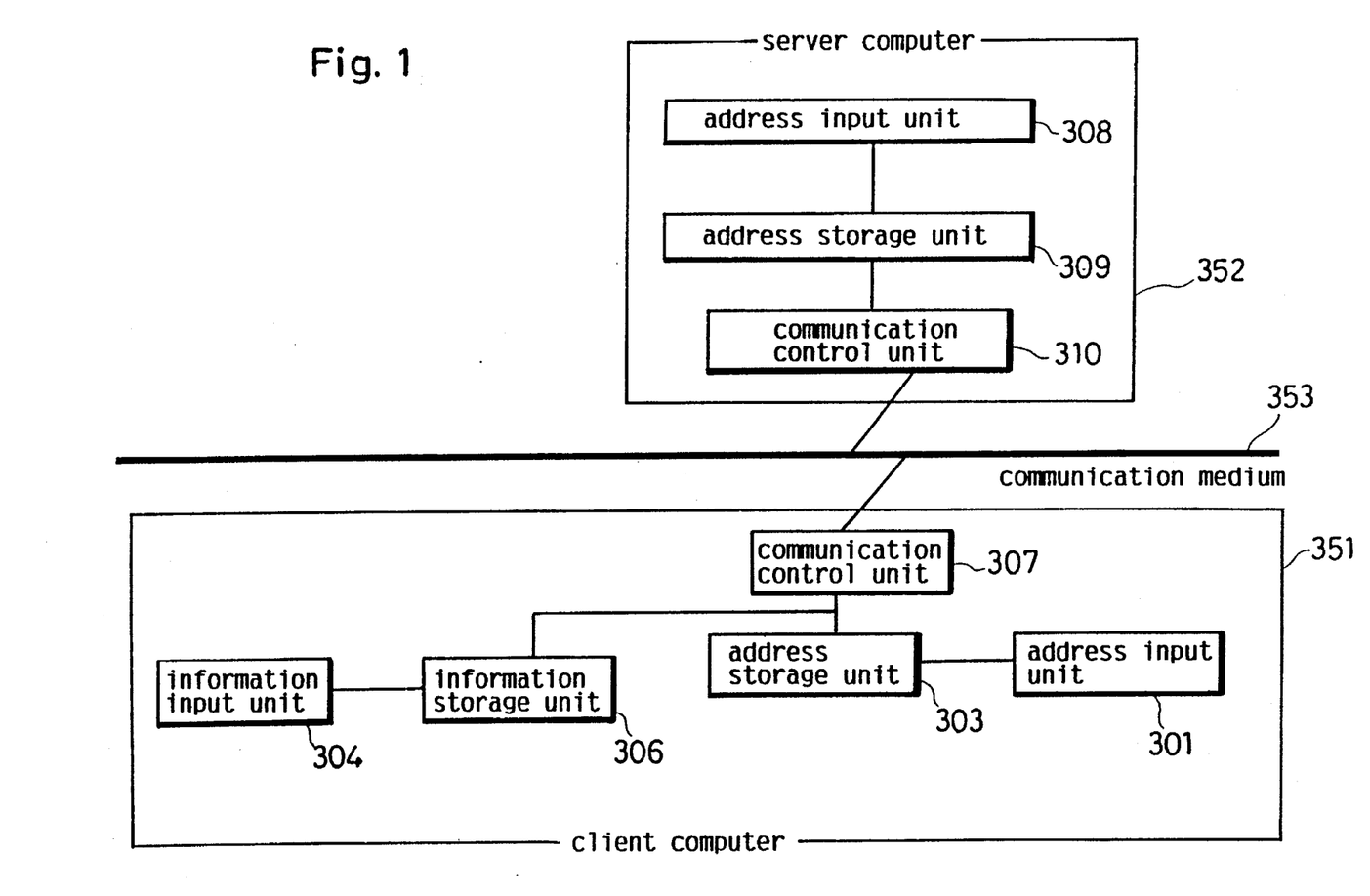
FIG. 1 is a block diagram showing the construction of computer systems applying a conventional apparatus for setting control information, and a network system applying the computer systems.

The following is a description of computer systems applying a conventional apparatus for setting control information, and a network system applying the computer systems with reference to FIG. 1.

A client computer 351 and a server computer 352 are connected with each other via a communication medium 353 which is optical fiber or a coaxial cable. The server computer 352 is usually connected with a plurality of such client computers. Each of the client computers 351 has its own network address such as an internet protocol(IP) address set therein so that the server computer 352 and the other client computers 351 can identify it. Also set to each of the computers is network environment setting information including a netmask and a broadcast address, and user environment setting information including the identifier of the computer, the names of registered users, and a password. (when both of the above information is referred to, it is referred to as environment setting information)

The client computer 351 is provided with the following units: an address input unit 301 for inputting its network address, an address storage unit 303 for storing the inputted network address, an information input unit 304 for inputting its environment setting information, an information storage unit 306 for storing the inputted environment setting information, a communication control unit 307 for controlling communication with the server computer 352 via the communication medium 353.

The server computer 352 holds the network addresses of all the client computers 351 to manage the entire network besides its own network address. It also has the environment setting information set therein like the client computers 351.

The server computer 352 is provided with the following units: an address input unit 308 for inputting the network address of every newly connected client computer 351 to the server computer 352, an address storage unit 309 for storing the inputted network addresses, a communication control unit 310 for controlling communication with the client computers 351 via the communication medium 353.

To connect a new client computer 351 with the network system having the above construction, setting of the network address and the environment setting information must be done as follows.

In the new client computer 351, the assigned network address is inputted from the address input unit 301 and stored in the address storage unit 303. The predetermined network environment setting information and the user environment setting information are inputted from the information input unit 304 and stored to the information storage unit 306.

In the server computer 352, the network address assigned to the client computer 351 is inputted from the address input unit 308 and stored to the address storage unit 309.

The communication control unit 310, if directed to transmit data to the client computer 351 by an application program or another program, reads the network address out of the address storage unit 309, generates a packet including transmission data and the read address, and transmits it to the communication medium 353. The communication control unit 307, when the network address contained in the received packet is identified with the network address stored in the information storage unit 303, transfers the data in the packet to the application program or the other. The communication control unit 307 also controls different communications it performs based on the network environment setting information stored in the information storage unit 306. For example, if the destination address contained in the received packet is identified with the broadcast address stored in the information storage unit 306, it is transferred to the application program or the other as the data sent to all the client computers 351.

An operation system program or another program provides the users the determined operational environment by reading out the user environment setting information stored in the information storage unit 306.

The above network system has various drawbacks as follows.

Many of the users have little knowledge of computer systems and are unaccustomed to handling the machines so that they are likely to fail in inputting serial numbers or characters correctly. This not only prevents the communication between the client computers 351 and the server computer 352, but also causes serious problems to the entire network system such as coming down of the system.

It is redundant that both the user and the supervisor of the system input the network address of the client computer 351 respectively to the same client computer 351 and to the server computer 352.

It is very hard for the unskilled users to set environment setting information by themselves.

SUMMARY OF THE INVENTION

The object of this invention is to provide an apparatus for setting control information of a computer system capable of bypassing redundant operations which frequently happen common control or administration information is set to a plurality of computer systems and capable of preventing the computer systems from being set to different control information.

The above object can be achieved by an apparatus for setting control information of a computer system comprising a storage device for storing the control information, a control information storage check device for checking if the control information is stored in the storage device, a control information request device for requesting the apparatus for setting control information of another computer system connected over a network to transmit the control information, when the storage device is judged not to store the information by the control information storage check device, a receive device for receiving the control information transmitted from the apparatus for setting control information of the other computer system and allowing the storage device to store it.

The above object can be achieved also by an apparatus for setting control information of a computer system comprising a storage device for storing control information to be set in the other computer system connected over a network, a receive device for receiving the request for transmitting the control information transmitted from the apparatus for setting control information of the other computer system, and a transmission device for transmitting the control information stored in the storage device to the apparatus for setting control information of the other computer system.

The above object can be achieved also by an apparatus for setting control information of a computer system comprising a storage device for storing the control information, an input device for accepting the input of the control information and storing it in the storage device, and a control information registration request device for requesting the apparatus for setting control information of the other computer system connected over the network to register inputted control information.

The above object can be achieved also by an apparatus for setting control information of a computer system comprising a receive device for receiving the request to register the control information transmitted from the apparatus of the other computer system, and a storage device for storing the requested control information.

The above object can be achieved also by a method for setting control information of a computer system comprising the steps of the control information to be set in a client computer system being stored to a server computer system, the control information being requested to transmit to the server computer system by the client computer system, the control information being transmitted by the server computer system upon the request, the transmitted control information being received by the client computer system, and the received control information being stored to the client computer system.

The above object can be achieved by a method for setting control information of a computer system comprising the steps of the control information being stored to the client computer system, the stored control information being transmitted to the server computer system and requested to be registered from the client computer system, and the control information being registered in the server computer system upon the request.

The control information includes a network address, network environment setting information, and different user environment setting information.

According to the above construction, the control information set in a computer system is transmitted to the other systems upon their request or voluntarily to be registered, which prevents redundant operations or setting failure. It is convenient to register such information to the computer system or the network system managed by an experienced user who inputs proper control information quickly.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 (a)(b) are flow charts depicting the operations of setting environment setting information in the server computer of an embodiment of this invention.

DESCRIPTION OF THE PREFERRED EMBODIMENT

Figure 2:
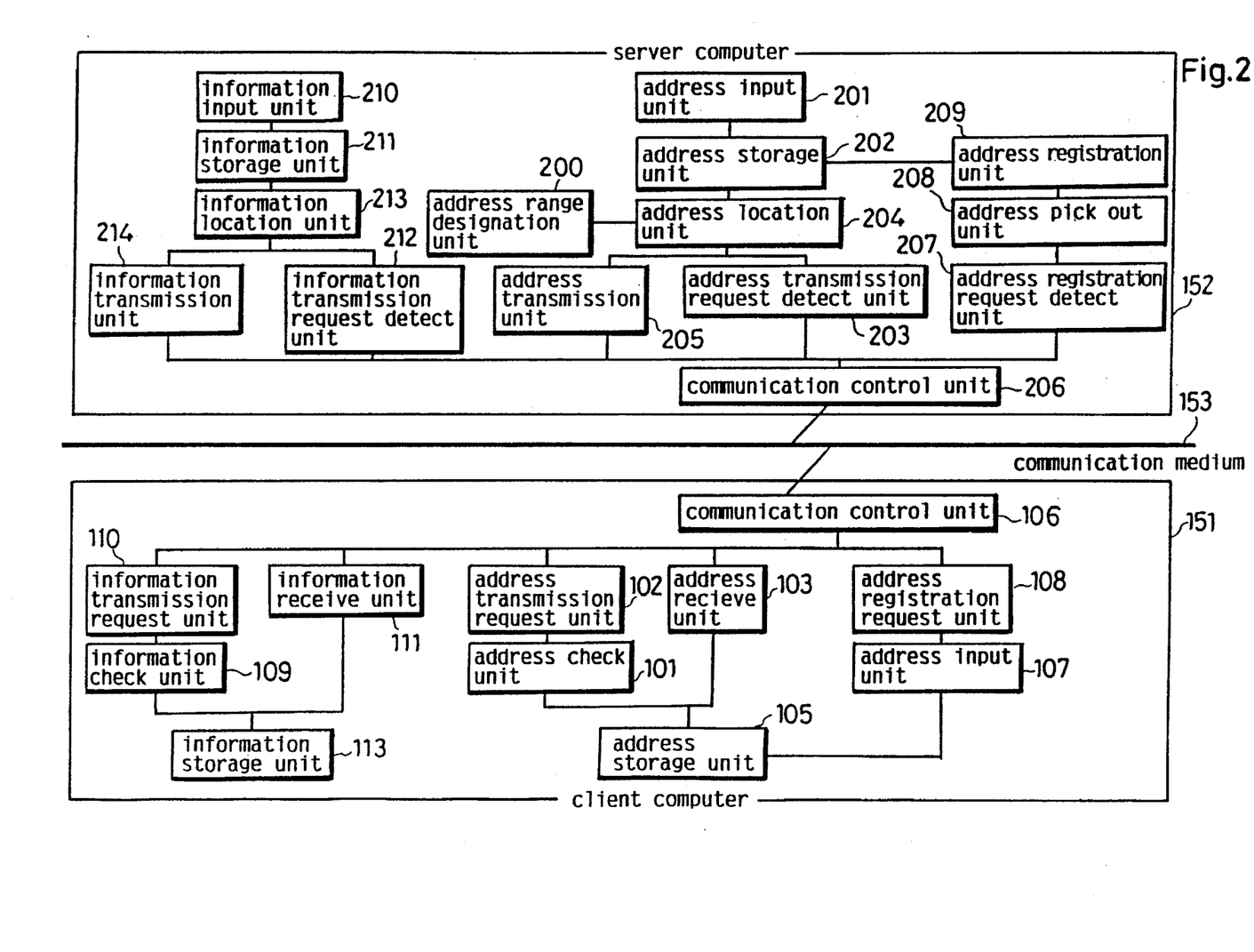
FIG. 2 is a block diagram showing the construction of computer systems applying an apparatus for setting control information of this invention, and a network system applying the computer systems.

In FIG. 2, a client computer 151 and a server computer 152 are connected with each other via a communication medium 153 which is optical fiber or a coaxial cable. The server computer 152 is usually connected with a plurality of client computers. Each of the client computers 151 has its own network address such as an internet protocol(IP) address set therein so that the server computer 152 and the other client computers 151 can identify it. Also set to each of the computers is network environment setting information including a netmask and a broadcast address, and user environment setting administration information including the identifier of the computer, the names of registered users, and a password all of which are necessary to the users. (when both of the above information is referred to, it is referred to as environment setting information)

The client computer 151 is provided with the following units: an address input unit 107 for inputting its network address, an address storage unit 105 for storing the inputted network address, an address registration request unit 108 for requesting the server computer 152 to register the network address, using an identifying number unique to the computer until the network address can be used, an address check unit 101 for checking if the network address is stored in the address storage unit 105, when, for example, the client computer 151 is raised, an address transmission request unit 102 for requesting the server computer 152 to transmit the network address when it is not stored in the address storage unit 105, an address receive unit 103 for receiving the network address transmitted from the server computer 152, a communication control unit 106 for controlling the communication with the server computer 152 via the communication medium 153, an information storage unit 113 for storing its environment setting information, an information check unit 109 for checking if the environment setting information is stored in the information storage unit 113, an information transmission request unit 110 for requesting the server computer 152 to transmit the environment setting information when it is not stored in the unit 113, and an information receive unit 111 for receiving the transmitted information.

The server computer 152 holds the network addresses of all the client computers 151 to manage the entire network besides its own network address. It also holds environment setting information to be set in the client computers 151 as well as has it set therein like the client computers 151.

The server computer 152 is provided with the following units: an address input unit 201 for inputting the identifying numbers of, and the network addresses preassigned to each of the client computers 151 to the server computer 152, an address storage unit 202 for storing the inputted network addresses and the identifying numbers in pairs, an address registration request detect unit 207 for detecting the request to register a network address transmitted from the client computer 151, an address pick out unit 208 for picking the network address out of the transmitted registration request information, an address registration unit 209 for making the unit 202 store the picked out network address, an address transmission request detect unit 203 for detecting the request to transmit the address, an address location unit 204 for locating the requested network address among those stored in the unit 202 using the identifying number as the key, and if not located, for generating a new address to assign to the client computer 151 according to a predetermined rule to make the unit 202 store it, an address range designation unit 200 for holding the range of the newly generated network address as the above rule, an address transmission unit 205 for transmitting the network address located and generated by the unit 204 to the client computer 151, a communication control unit 206 for controlling communication with the client computers 351 via the communication medium 153, an information input unit 210 for inputting the environment setting information to be set to each client computer 151, an information storage unit 211 for storing the inputted environment setting information and the identifying numbers in pairs, an information transmission request detect unit 212 for detecting the request to transmit the environment setting information, an information location unit 213 for locating the requested environment setting information among those stored in the information storage unit 211 using the network address contained in the request as the key, and an information transmission unit 214 for transmitting the located environment setting information to the client computer 151.

The following is a description of the operations performed by the client computers 151 and the server computer 152 having the above construction.

Network addresses are set as follows.

Figure 3:
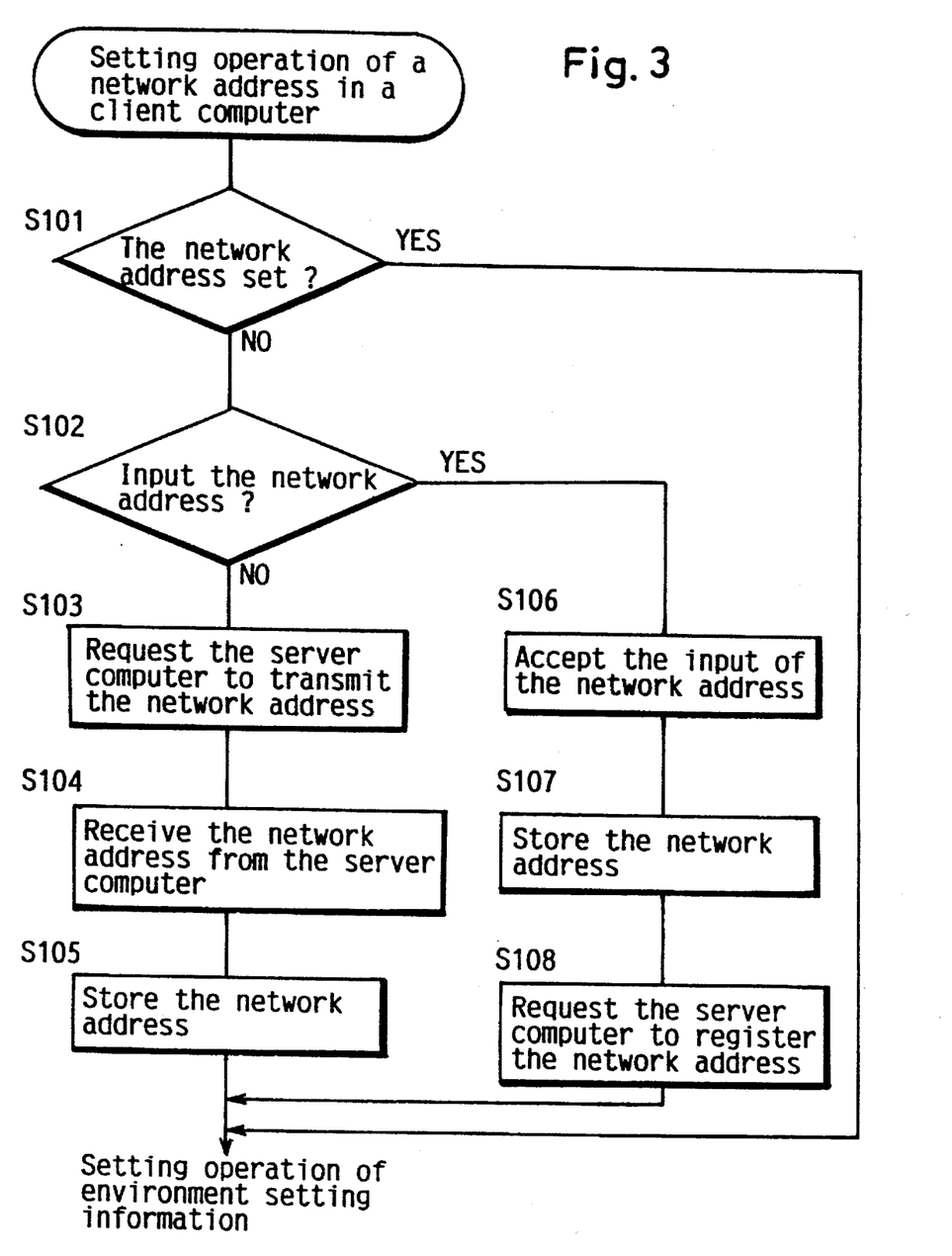
FIG. 3 is a flow chart depicting the operations of setting network a address in the client computer of an embodiment of this invention.

After a client computer 151 has been booted, the address check unit 101 checks if the network address is stored in the address storage unit 105 or not as shown in FIG. 3 (S101). If stored, the operations for setting environment setting information follows this.

On the other hand, if not stored, the client computer 151 either asks the server computer 152 for the network address or directs the user to input it (S102).

If the former is performed, the address transmission request unit 102 transmits a packet requesting for the transmission of the network address to the server computer 152 via the communication control unit 106 (S103). The packet includes the identifying number of the client computer 151.

After the server computer 152 has transmitted the network address upon the request as described later, the address receive unit 103 receives it and allows the address storage unit 105 to store it (S105).

On the other hand, if the latter is performed at (S102), the network address is inputted to the address unit 107 (S106), and the address storage unit 105 stores it (S107). After that, the address registration request unit 108 transmits a packet requesting registration of the network address to the server computer 152 (S108).

Figure 4A:
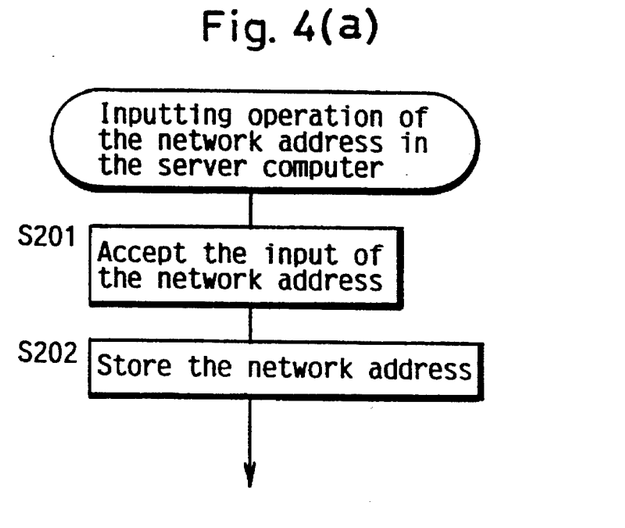
FIG. 4(a)-(c) are flow charts depicting the operations of setting a network address in the server computer of an embodiment of this invention.

In the server computer 152, after the operation directing the server computer 152 to input the network address of the client computer 151, the network address is inputted to the address input unit 201 as shown in FIG. 4(a)(S201), and the address storage unit 202 stores it (S202).

Figure 4B:
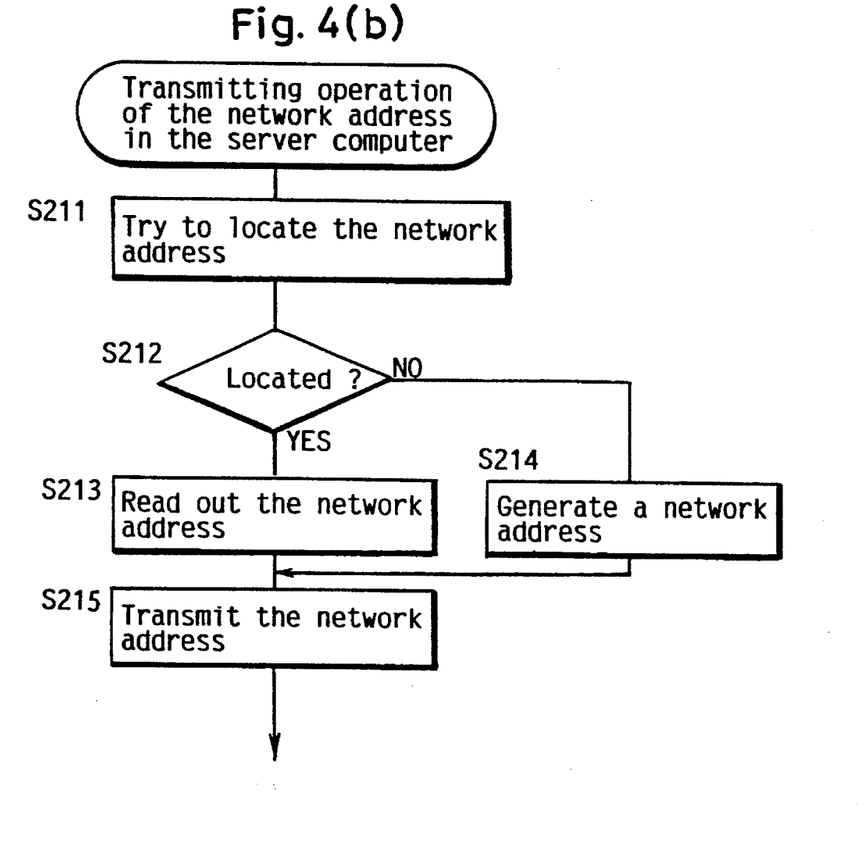

When the address transmission request detect unit 203 detects the packet requesting the network address transmitted from the client computer 151, the operation shown in FIG. 4(b) is carried out.

The address location unit 204 tries to locate the network address in the address storage unit 202 using the identifying number included in the packet as the key (S211).

If it is stored, the unit 204 reads it out (S213), otherwise it generates a network address in the range designated by the address range designation unit 200 (S214). The address transmission unit 205 transmits a packet including the network address which is either read out or generated, and the identifying number (S215). After that, the client computer 151 stores the network address as above.

Figure 4C:
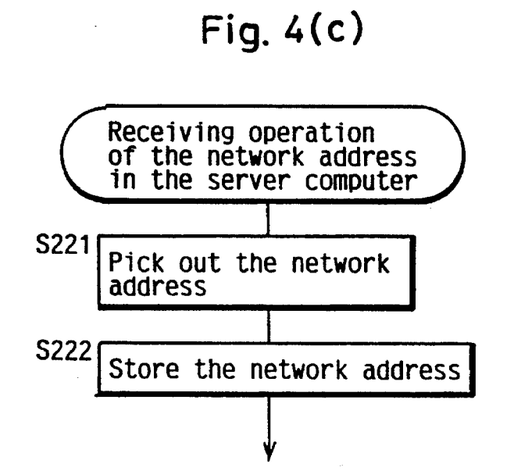

When the address registration request detect unit 207 detects the packet requesting to register the network address transmitted from the server computer 152 at (S108), the operation shown in FIG. 4(c) is carried out.

The address pick out unit 208 picks out the network address and the identifying number included in the packet (S221). The address registration unit 209 makes the address storage unit 202 store the picked out network address and the identifying number (S222).

Environment information is set as follows.

Figure 5:
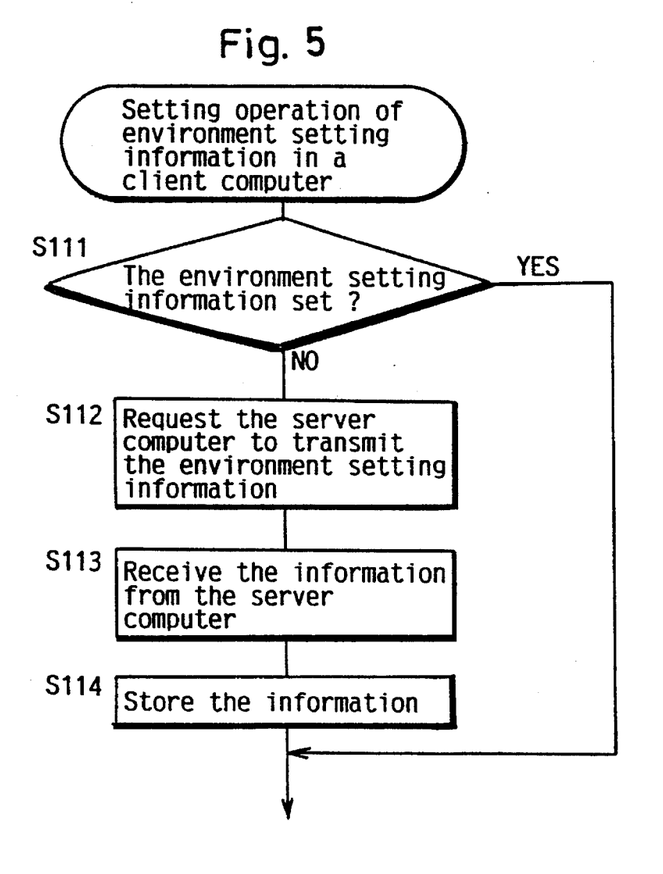
FIG. 5 is a flow chart depicting the operations of setting environment setting information in the client computer of an embodiment of this invention.

In the client computer 151, the information check unit 109, as shown in FIG. 5, checks if the environment setting information is stored or not in the information storage unit 113 (S111). If stored, another processing follows this. If not stored, the information transmission request unit 110 transmits the packet requesting to transmit the environment setting information via the communication control unit 106 to the server computer 152 (S112).

After the server computer 152 has transmitted the network address upon the request as described later, the information receive unit 111 receives it (S113) and allows the information storage unit 113 to store it (S114).

Figure 6A:
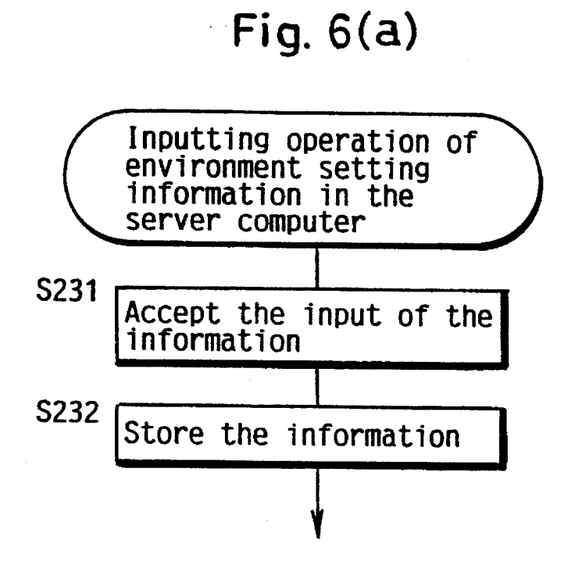

On the other hand, in the server computer 152, if an operation directing the server computer 152 to input the environment setting information has been set in the client computer 151, the information input unit 210 accepts the input of the information as shown in FIG. 6 (a) (S231), and allows the information storage unit 211 to store it (S232).

Figure 6B:
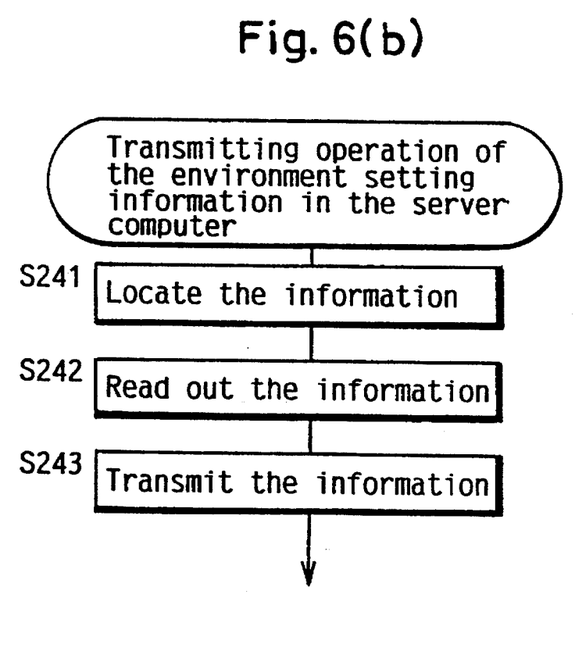

When the information transmission request detect unit 212 detects the packet requesting to transmit environment setting information transmitted from the client computer 151, the operation shown in FIG. 6(b) is carried out.

The information location unit 213 locates the environment setting information stored in the information storage unit 211 using the addresser network address included in the packet as the key (S241).

If the information is stored, the unit 213 reads it out (S242). The information transmission unit 214 transmits the packet including the read information (S243). After that, the client computer 151 stores the information as above.

Unlike the above embodiment, the address storage unit 202 may be designed to check each newly generated address before storing to avoid duplication.

Packets having a special format may be used for transmitting network addresses, requesting to register them and the like, or the information indicating the above request may be included in the payload of packets having an ordinary format.

The information location unit 213 may be designed to locate environment setting information using an identifying number, instead of a network address, as the key so that the environment setting information can be set in the client computer 151 before the network address has been set.

When the environment setting information requested by the client computer 151 is not stored, predetermined default environment setting information may be transmitted for it.

The information location unit 213 may be designed to set environment setting information per group of the client computers 151 so that it can locate information using the numbers indicating the groups as the key.

The same unit 213 may be omitted when common environment setting information is set to all the client computers 151.

Environment setting information as well as the network address may be inputted to the client computer 151 in addition to the server computer 152.

Network addresses and environment setting information from the server computer 152 may be designed to be transmitted voluntarily when it is confirmed to exist, instead of responding to the request of the client computer 151.

Whether a network address or environment setting information is stored in either the address storage unit 105 or the information storage unit 113 may be checked when a communication is actually carried out, when the user desires, or when the client computer 151 is newly connected with the communication medium 153, instead of when the client computer is raised.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus for setting control information in a client computer to enable the initialization and operation of the client computer in a network of multiple computers, the apparatus comprising:

client storage means in the client computer for storing the control information in the client computer for use when stored and when the client computer system is later booted;

client storage check means in the client computer for checking if the control information is already stored in the client storage means when the client computer is booted;

client request means in the client computer for automatically requesting a server computer connected over the network to transmit the control information when the client storage means is judged not to stored the control information means by the client storage check means;

server storage means in the server computer for storing the control information for transmission to the client computer upon request;

server storage check means in the server computer for checking if the control information is already stored in the server storage means when the client request means requests the control information;

server generation means in the server computer for automatically generating the control information for transmission to the client computer upon request if the server storage check means determines that the server storage means does not already have the control information;

server storage update means for automatically storing the control information generated by the server generation means in the server storage means for later use;

server transmission means for transmitting the control information that was obtained from the server storage means or the server generation means to the client computer;

client receive means in the client computer for receiving the control information transmitted from the server computer; and client storage update means for automatically storing the control information received from the server computer in the client storage means for both immediate use and later use, whereby control information for allowing the client computer to operate in the network is automatically requested by the client computer, but only if not already available in the client computer, is automatically generated by the server computer, but only if not already available in the server computer, is automatically provided to the client computer, and is automatically stored in the client storage means for immediate and later use.

2. The apparatus for setting control information of claim 1, wherein the control information is a network address to identify the client computer when data is transmitted over the network.

3. The apparatus for setting control information of claim 1, wherein the control information is network environment setting information to define the conditions for operating the network.

4. The apparatus for setting control information of claim 3, wherein the network environment setting information is a broadcast address used as a destination address when the client computer performs broadcast communication.

5. The apparatus for setting control information of claim 1, wherein the control information is user administration information defining the conditions for operating the client computer.

6. The apparatus for setting control information of claim 5, wherein the user administration information is names of registered users.

7. The apparatus for setting control information of claim 1, further comprising:

server input means for inputting the control information to be stored in the server storage means.

8. The apparatus for setting control information of claim 1, further comprising:

server location means for locating the control information corresponding to the client computer system in the server storage means.

9. The apparatus for setting control information of claim 8, wherein the server storage means stores identifying information to identify the client computer and the control information corresponding to the client computer in pairs, and wherein the server location means locates the control information using the identifying information that was transmitted from the client computer as a key.

10. The apparatus for setting control information of claim 9, wherein the identifying information used to identify the client computer consists of identifying information unique to the particular client computer.

11. The apparatus for setting control information of claim 9, wherein the identifying information to identify the client computer is a network address.

12. The apparatus for setting control information of claim 8, further comprising:

requirement storing means for storing requirements information concerning the control information to be generated by the server generation means.

13. The apparatus for setting information of claim 12, wherein the control information is comprised of a network address used to identify the client computer when data is transmitted over the network, and the requirements storing means stores requirements information indicating a permissible range of network address.

14. A method for setting control information of a network of communicating computer systems, comprising the steps of:

- storing the control information in a client computer system, when available, for use when stored and for later use;
- transmitting the stored control information from the client computer system to a server computer system;
- storing the control information that was transmitted to the server computer system in the server computer system for use when stored and for later use;
- requesting the server computer system to transmit the control information to the client computer system if the control information is not already available in the client computer system;
- generating the control information in the server computer system automatically if it was not already stored in the server computer system;
- storing the control information automatically that was generated in the server computer system;
- transmitting the control information that was stored or generated in the server computer system from the server computer system to the client computer system;
- receiving the transmitted control information in the client computer system; and
- storing the received control information in the client computer system for use when stored and to be available for later use.

15. An apparatus for setting control information of a network of communicating client and server computers, comprising:

- first client storage means in the client computer for storing network information corresponding to the client computer including a network address of the client computer for use when stored and for later use;
- second client storage means in the client computer for storing user information including a user name of the client computer for use when stored and for later use;
- first judgment means in the client computer for judging whether the network information is stored in said first client storage means;
- second judgment means in the client computer for judging whether the user information is stored in said second client storage means;
- first request means for requesting the server computer to transmit the network information to the client computer if the first judgment means judges that the network information is not stored in the first client storage means;
- second request means for requesting the server computer to transmit the user information to the client computer if the second judgment means judges that the user information is not stored in the second client storage means;
- first server storage means in the server computer for storing the network information;
- second server storage means in the server computer for storing the user information;
- server generation means for automatically generating the network information if the network information corresponding to the client computer is not already in the first server storage means;
- means for automatically storing the network information generated in the first server storage means for later use;
- first server transmission means for transmitting the network information corresponding to the client computer stored in the first server storage means or generated by the server generating means to the client computer; and
- second server transmission means for transmitting the user information corresponding to the client computer stored in the second server storage means to the client computer;
- first client reception means in the client computer for receiving the network information transmitted from the server computer, and storing the received network information to the first client storage means for use when stored and for later use; and
- second client reception means in the client computer for receiving the user information transmitted from the server computer, and for storing the received user information in the second client storage means for use when stored and for later use,
- whereby the network can be automatically set up even if the first client storage means, the second client storage means, the first server storage means, and the second server storage means are empty and, once such respective storage means contain the respective information, the network can be automatically set up without burdening the network with transmission requests.

16. The apparatus of claim 15, wherein the network information includes a broadcast address.

17. The apparatus of claim 15, wherein the user information includes a pass word corresponding to the user name.

18. The apparatus of claim 15, wherein at least one of the first judgment means and the second judgment means perform a judgment operation when said client computer system is booted.

19. The apparatus of claim 15, further comprising:

- input means for inputting network information to said network information storage means and user information to said user information storage means.

* * * * *